(12) United States Patent
Garbe

(10) Patent No.: US 8,317,504 B2
(45) Date of Patent: Nov. 27, 2012

(54) APPARATUS AND METHOD FOR THE PRODUCTION OF PLASTIC GRANULATE

(75) Inventor: Frank Garbe, Klingenberg (DE)

(73) Assignee: Automatik Plastics Machinery GmbH, Grossostheim (DE)

(*) Notice: Subject to any disclaimer, the term of this patent is extended or adjusted under 35 U.S.C. 154(b) by 355 days.

(21) Appl. No.: 12/594,392

(22) PCT Filed: Apr. 1, 2008

(86) PCT No.: PCT/DE2008/000530
§ 371 (c)(1),
(2), (4) Date: Oct. 2, 2009

(87) PCT Pub. No.: WO2008/119336
PCT Pub. Date: Oct. 9, 2008

(65) Prior Publication Data
US 2010/0109177 A1    May 6, 2010

(30) Foreign Application Priority Data
Apr. 3, 2007 (DE) .......................... 10 2007 016 347

(51) Int. Cl.
*B29C 47/92* (2006.01)
(52) U.S. Cl. ......................... 425/169; 425/307; 264/40.1
(58) Field of Classification Search .................. 425/169, 425/307; 264/40.1
See application file for complete search history.

(56) References Cited

U.S. PATENT DOCUMENTS

| 3,438,493 A * | 4/1969 | Goble ........................... 209/590 |
| 3,483,594 A | 12/1969 | Hewitt |
| 4,030,205 A | 6/1977 | Robertson et al. |
| 5,330,340 A | 7/1994 | Suppon et al. |
| 6,428,298 B1 * | 8/2002 | Clauss et al. ..................... 425/71 |
| 6,438,866 B1 | 8/2002 | Meydell et al. |
| 2006/0121142 A1 | 6/2006 | Pinchot |

FOREIGN PATENT DOCUMENTS

| DE | 2850584 A1 | 6/1980 |
| DE | 4414753 A1 | 11/1995 |
| DE | 69318829 T2 | 12/1998 |
| DE | 19931222 A1 | 1/2001 |
| DE | 10302645 A1 | 7/2004 |

(Continued)

OTHER PUBLICATIONS

"PCT International Search Report dated Aug. 18, 2008 for PCT/DE2008/000530, from which the instant application is based," 2 pgs.

(Continued)

*Primary Examiner* — Joseph Del Sole
*Assistant Examiner* — James Sanders
(74) *Attorney, Agent, or Firm* — Fredrikson & Byron, P.A.

(57) ABSTRACT

The invention relates to a method and a device for producing plastic granulate, having a granulator which breaks up essentially continuously conveyed plastic mass flow into granulate particles, the granulator (17, 40) comprising a cutting unit (21, 22; 32, 33, 34), whose cutting elements engage on the plastic mass flow when breaking up the plastic, and the device (1, 31) comprising at least one oscillation sensor (24, 25; 60, 61), using which oscillations occurring on the device (1, 31), in particular on the granulator (17, 40), may be detected.

10 Claims, 2 Drawing Sheets

FOREIGN PATENT DOCUMENTS

| | | |
|---|---|---|
| DE | 102004011325 A1 | 9/2004 |
| DE | 10352106 A1 | 6/2005 |
| DE | 102004004680 A1 | 10/2005 |
| DE | 102004053929 A1 | 5/2006 |
| DE | 102005004533 A1 | 8/2006 |
| EP | 0632758 A1 | 1/1995 |
| EP | 0814311 A | 12/1997 |
| EP | 0632758 B1 | 5/1998 |
| EP | 0972622 A1 | 1/2000 |
| JP | 6218726 A | 8/1994 |
| WO | 9318897 A1 | 9/1993 |

OTHER PUBLICATIONS

PCT International Search Report dated Aug. 20, 2008 for PCT/DE2008/000529, 3 pgs.

"PCT International Preliminary Report on Patentability dated Nov. 10, 2009 for PCT/DE2008/000530, from which the instant application is based," 9 pgs.

* cited by examiner

APPARATUS AND METHOD FOR THE PRODUCTION OF PLASTIC GRANULATE

RELATED APPLICATIONS

This application is a 35 U.S.C. 371 national stage filing from International Application No. PCT/DE2008/000530 filed Apr. 1, 2008, which claims priority to German Patent Application No. 10 2007 016 347.0, filed Apr. 3, 2007, the teachings of which are incorporated herein by reference.

The invention relates to a device for producing plastic granulate. The device has a granulator that includes cutting elements, which engage an essentially continuously conveyed plastic mass flow, in order to break the plastic flow into granulate particles. Furthermore, the invention relates to a method for operating such a device during the production of plastic granulate.

Devices and methods of the generic type are used during the production of plastic granulate. Devices of this type are situated downstream from polymerization reactors, for example, to bring the plastic polymerized in the reactor into a form which is easy to transport and well suited for storage. The plastic mass flow flowing out of the reactor is broken up into small granulate particles in a granulator. These granulate particles may be metered easily and conveyed well. In addition, the granulate particles may be packaged in bags and subsequently transported and stored. Compounding plants, in which a polymer is mixed with additives to form a compound, may also be situated downstream from devices of the generic type.

To be able to break the plastic mass flow into the granulate particles, the granulator comprises a cutting unit, whose cutting elements are engaged on the plastic mass flow when breaking up the plastic. It is conceivable both that the plastic is still in the molten state and thus is plastically deformable, and also that the plastic has already solidified into a solid strand.

Devices of the generic type for granulating plastic mass flows are described, for example, in DE 199 31 222 A1 and DE 103 02 645 A1. In the first device cited, the plastic strands are first cooled enough so that they form a strand-shaped solid. These plastic strands are then broken into granulate particles using a rotating cutting roller over a fixed cutting strip. In the second device cited, the liquid plastic is conveyed into a chamber having water flowing through it and broken up therein using cutters sweeping over the outlet nozzles.

The granulation process is highly complex and is influenced by multiple boundary conditions. Furthermore, the status of the granulation device is of great significance for the granulation product, in particular because high wear may occur during granulation, which negatively influences the granulation product. In the known granulation devices, continuous process monitoring and/or continuous monitoring of the status of the granulation device are not possible. Rather, it is the task of the operator to ensure adequate process checking of the granulation process and/or adequate status checking of the granulation device on the basis of specific parameters, for example, by checking the granulation product or by specific processing measures, such as predictive maintenance.

Proceeding from this prior art, it is therefore the object of the present invention to suggest a novel granulation device for producing plastic granulate, which allows improved processing and/or status monitoring. Furthermore, it is the object of the present invention to suggest a method for operating a granulation device having improved processing and/or status monitoring.

This object is achieved by a device and a method, respectively, according to the teaching of the two independent main claims.

Advantageous embodiments of the invention are the subject matter of the subclaims.

The device according to the invention is based on the main idea that the device comprises at least one oscillation sensor, using which oscillations occurring on the granulator may be detected. Experiments on granulation devices have shown that the oscillations occurring in the device significantly characterize the granulation process and/or the status of the granulation device. By detecting the oscillations occurring on the granulation device, the information significantly characterizing the granulation process and/or the status of the device therein may be analyzed and/or derived easily.

The manner in which the oscillation signals detected using the oscillation sensor are processed further is fundamentally arbitrary. In an especially simple variant, a display unit is provided on the device, such as a display screen or a printer, using which the frequency signals detected using the oscillation sensor and/or the frequency curve detected over time may be displayed. By appropriate checking of this display, the operator then has the capability of drawing conclusions from the signal curve and deriving suitable measures therefrom easily. Alternatively or additionally to the simple display of the frequency signals and/or the frequency curve, a frequency analysis unit may also be provided on the device. For this purpose, for example, appropriate suitable software may be installed on the master computer of the device. The frequency curve detected using the oscillation sensor may then be analyzed using the frequency analysis unit, the analysis preferably running automatically.

The oscillation parameter which is detected using the oscillation sensor is fundamentally arbitrary. It is especially significant for describing the granulation process and/or the status of the granulation device if the effective oscillation strength occurring on the granulator is measured. For example, if increased wear occurs on the device, the running of the machine becomes noisier, by which the effectively occurring oscillation strength increases. If a specific oscillation strength is exceeded, correct processing reliability of the granulation process is then no longer provided.

There are greatly varying possibilities for performing the frequency analysis using the frequency analysis unit. According to a preferred embodiment, reference frequency curves or reference frequency signals are stored in the frequency analysis unit. These stored reference frequency curves or reference frequency signals correlate with known features significantly characterizing the granulation process or the status of the granulation device. The current processing and/or device status may be concluded by a comparison of the actual frequency curve detected using the oscillation sensor with the stored reference curves and/or reference signals.

It is especially significant if reference oscillation levels are stored in the frequency analysis unit. These reference oscillation levels are individual values which each characterize a specific oscillation strength. The effectively occurring oscillation strength detected on the device using the sensor is compared with this reference oscillation level and a conclusion in regard to the processing status and/or the device status is drawn from the comparison result.

In an expansion of the principle according to the invention for detecting oscillation signals on the granulation device, an oscillation actuator may also additionally be provided in the device. Targeted oscillation signals, such as oscillation pulses, may be generated for frequency excitation using this oscillation actuator. The signal response correlating with this frequency excitation is detected using the oscillation sensor, so that in turn conclusions in regard to the processing status and/or the device status may be drawn from the correlation between oscillation excitation and oscillation response.

The construction of the granulator in the granulation device is fundamentally arbitrary. According to one construction, a fixed cutting strip and a driven cutting rotor are provided in the granulator, the plastic strands being broken up into granulate in the cutting gap between cutting strip and cutting rotor. This type of granulation is characterized extraordinarily significantly by the occurring oscillation signals and is therefore outstandingly suitable for implementing the principle according to the invention.

It is especially advantageous if the oscillation sensor detects oscillations occurring on the cutting strip and/or on the cutting rotor. In particular, the wear occurring in the granulator may be concluded very well through analysis of the oscillations occurring on the cutting strip and/or on the cutting rotor, to implement effective wear monitoring in this manner.

Alternatively to the construction of the granulator having cutting strip and cutting rotor (strand granulator), the principle according to the invention may also be implemented on constructions which comprise a fixed nozzle plate and rotating cutters which sweep over this nozzle plate (underwater granulator). The malleable plastic exits from the nozzles in the nozzle plate in strands in a chamber having water flowing through it and is broken up into granulate particles by the cutters sweeping over the nozzle plate even before solidification. In this construction of the granulator it is especially advisable if the oscillation sensor detects oscillations occurring on the nozzle plate and/or on the cutters. The oscillation analysis may preferably also be used for wear monitoring here.

The method according to the invention for operating a granulation device is characterized in that firstly the oscillations occurring on the granulator of the granulation device are detected using an oscillation sensor and subsequently the oscillation signals thus measured are analyzed in a frequency analysis unit. The monitoring of the production process and/or the status of the granulation device is then implemented using the resulting data of the frequency analysis.

For example, it is possible through suitable frequency analysis to conclude material properties of the material to be granulated, in particular the temperature, the moisture, and/or the geometry of the granulate, and to monitor the adherence to specific limiting values.

Alternatively or additionally thereto, it is also possible to conclude the correct setting of the granulator, such as the correct adjustment of the cutting gap between rotor and cutting strip, through frequency analysis.

In addition, the wear of the granulation device may also be concluded and wear monitoring may be implemented by suitable frequency analysis.

In this manner, a preventive maintenance measure may be suggested and/or triggered as a function of the result of the wear monitoring.

In particular a remaining run parameter, such as a remaining runtime of the granulation device until performing an unavoidable maintenance measure, may be calculated from the analysis result of the frequency analysis, to be able to derive consequences for further process planning in this manner.

In particular, the remaining run parameter may be compared with the requirement parameters of running and/or upcoming production batches. In this manner it is possible to estimate whether the running or upcoming production batch may still be concluded before the maintenance measure. For example, if only a relatively short still remaining runtime results until the time at which significant wear damage must be expected on the basis of the frequency analysis result, a replacement granulation device may already be started up beforehand and the next production batch may be switched over to this replacement granulation device. It is also conceivable to provide and/or interpose suitable maintenance measures before beginning the granulation of a new batch.

Especially simple and effective frequency analysis results if the detected actual frequency curves are compared with stored reference frequency curves or stored reference frequency signals.

If new, previously unknown significant events occur during the operation of a granulation device, the actual frequency curves detected during these events may be stored as new reference frequency curves and/or new reference frequency signals to expand the database of the reference frequencies in this manner (teaching of the reference frequencies).

To simplify the teaching of reference frequencies, corresponding teaching may be offered automatically by the plant controller after the occurrence of significant events, the new reference frequency curve only being stored after acknowledgment by the operator.

Multiple strategies are conceivable in the comparison of the actual frequency curves with the reference frequency curves. According to one possible strategy, it is monitored whether the actual frequency curve approximates a specific reference frequency signal and/or a specific reference frequency curve. If the approximation falls below a specific tolerance value, a warning signal may be generated to warn the operator before the occurrence of an event correlating with the reference frequency curve and/or with the reference frequency signal.

The warning signal may contain information about the event to be expected and/or information about the duration until the occurrence of this event on the basis of the frequency analysis.

Alternatively or additionally to generating a warning signal, an alarm signal and/or an emergency shutoff may be generated or triggered, respectively.

According to a preferred method variant, the effectively occurring oscillation strength detected using the oscillation sensor is compared with a stored reference oscillation level.

According to a further method variant, an oscillation signal, in particular an oscillation pulse for frequency excitation of the granulator, is generated using an oscillation actuator. The oscillations thus caused on the granulator are detected using the oscillation sensor. If a frequency analysis unit is provided, the status of the process and/or the device may be concluded from the comparison between the oscillation signal generated using the actuator and the oscillation response measured on the granulator.

An especially differentiated analysis is possible if the frequency curve detected using the frequency sensor is decomposed by mathematical frequency analysis methods, in particular by Fourier transform, into individual frequency components of a frequency spectrum in the frequency analysis unit. It is thus possible, for example, for specific frequency components to be monitored in regard to specific significant events or significant statuses or system components.

Various embodiments of the invention are schematically illustrated in the drawings and explained for exemplary purposes hereafter.

Figure 1:
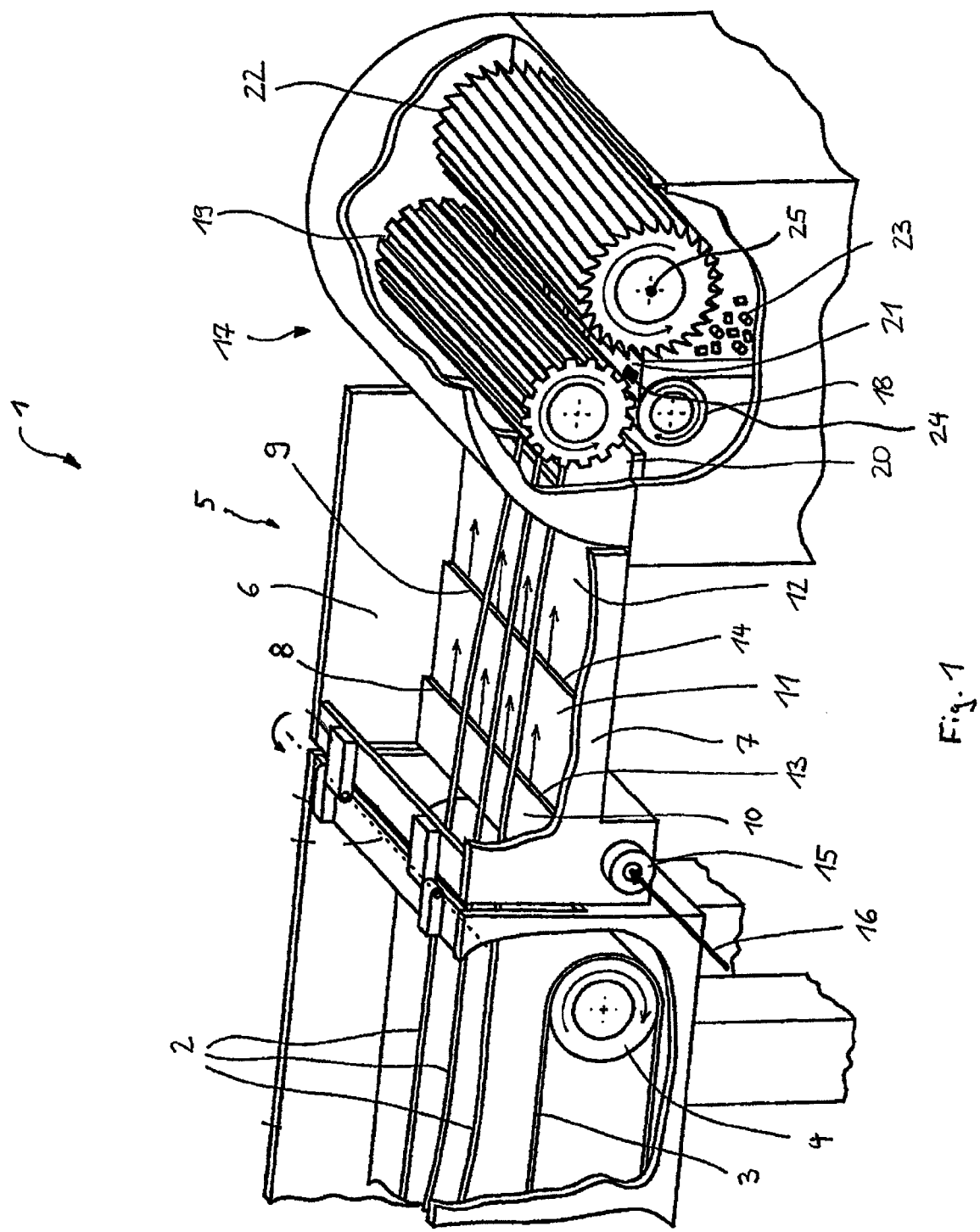
FIG. 1 shows a strand granulation device for granulating solidified plastic strands having a cutting rotor and cutting strip in a perspective view.

FIG. 1 illustrates a granulation device 1 for granulating molten strands 2 of plastic exiting from nozzles (not shown here). The end of the dewatering line following the cooling line (also not shown) is shown, in which the strands 2 are carried and transported by the revolving conveyor belt 3, the conveyor belt 3 being moved by the driven deflection roller 4. This is thus prior art.

The intake support 5 adjoins the dewatering line, onto which the strands 2 are pushed by the moved conveyor belt 3. The intake support 5 has the two steps 8 and 9 between the two walls 6 and 7 (the latter is shown broken away), before and after which the support surfaces 10, 11, and 12 are situated. The support surface 10 extends closely up to the conveyor belt 3, so that the strands 2 transported by the conveyor belt 3 are pushed securely onto the support surface 10. The step 8 is used to form the slotted nozzle 13, which extends transversely over the intake support 5. The slotted nozzle 14, which also extends transversely over at the intake support 5, is correspondingly implemented in the step 9. Compressed air is supplied to these slotted nozzles via the tubular air connection 15, so that an air flow indicated in each case by the four adjacent short arrows exits from each of the slotted nozzles 13 and 14, which acts on the strands lying on the support surfaces 11 and 12 and entrains them, so that the further conveyance of the strands 2 is also ensured in the area of the intake support 5. This action of the air flow extends up to the end of the support surface 12, which extends into the intake of a granulator 17. It is ensured in this manner that in the area extending from the end of the transport belt 3 up to the intake of the granulator 17, which is filled up by the intake support 5, a traction is exerted on the strands 2 which results in secure guiding of the strands up into the granulator 17, so that in the area after the dewatering line, i.e., after the strands 2 have left the transport belt 3, undesired wriggling and thus tangling of the strands does not occur.

As known from the prior art, the granulator 17 comprises two drawing-in rollers 18 and 19, which leave a drawing-in gap open between them, into which the intake 20 of the granulator 17 extends. The strands drawn in by the drawing-in rollers 18 and 19 reach a fixed cutter blade 21, against which a cutting rotor 22 runs and breaks the strands into granulate particles 23.

Oscillation sensors 24 and 25 are integrated in the cutter blade 21 and the cutting rotor 22, respectively, to detect the oscillations occurring in the granulator 17 as the granulate particles 23 are broken up. The oscillation signals detected using the sensors 24 and 25 are relayed via lines (not shown) to the controller of the granulation device 1 and are analyzed therein using a frequency analysis unit. The analysis results provide information about the status of the granulation process and/or the status of the granulation device 1, in particular the granulator 17. In particular, the wear in the granulator 17 may be concluded by suitable oscillation analysis.

Figure 2:
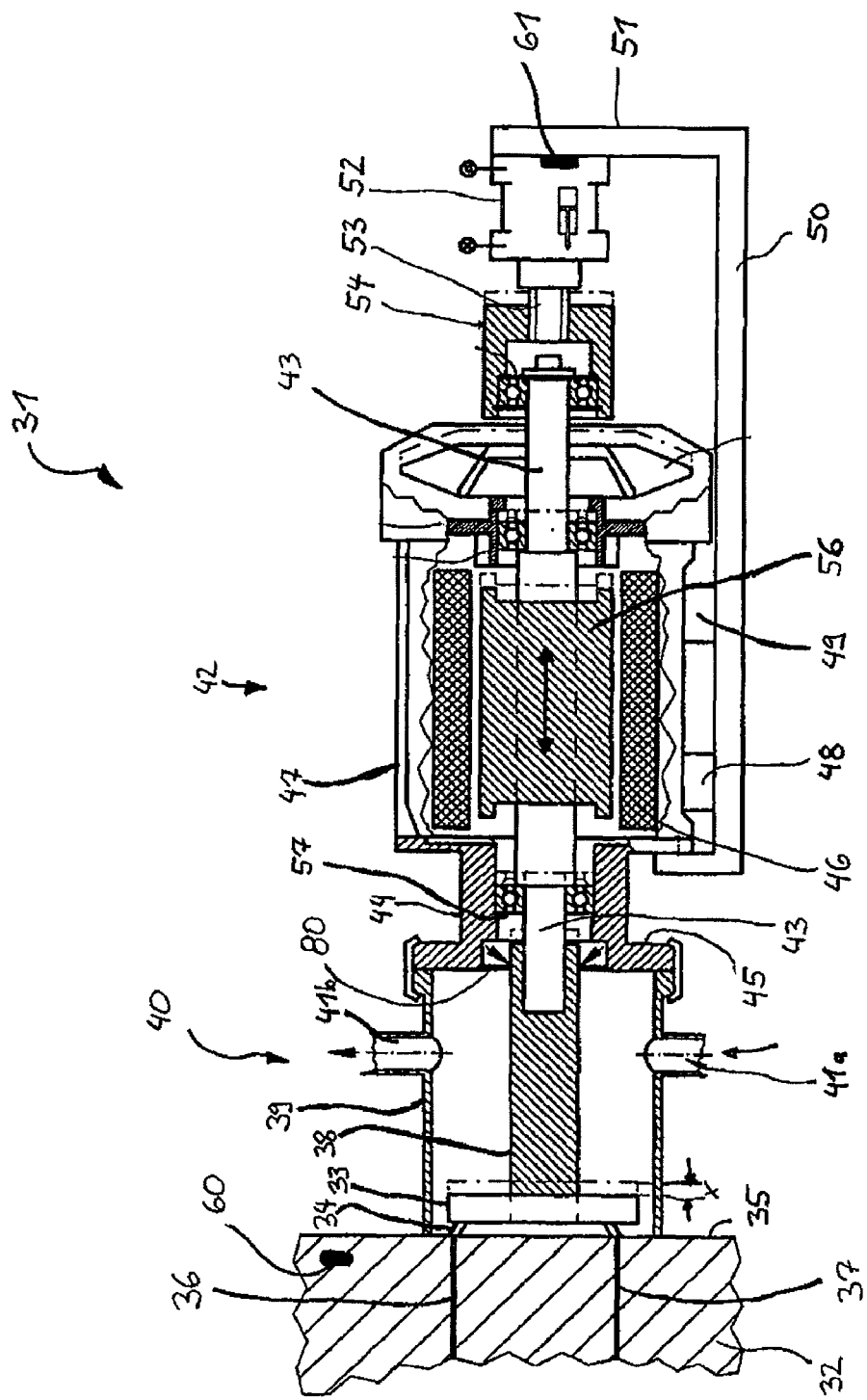
FIG. 2 shows an underwater granulation device having a nozzle plate and cutter blades in cross-section.

FIG. 2 shows a device 31 having a granulator 40 having a nozzle plate 32 and a rotating cutter head 33, whose cutters 34 sweep over the exit side 35 of the nozzle plate 32 and chop the plastic melt exiting from the nozzles 36 and 37 into granulate particles. The nozzle plate 32 contains a large number of annularly situated nozzles 36 and 37, which are not shown in FIG. 2. This design is a known configuration.

The cutter head 33 is set into rotation via the rotor axis 38, the rotor axis 38 being housed together with the cutter head 33 and the cutters 34 in a housing 39, which has a coolant flowing through it, which flows into the inlet 41a and flows out via the outlet 41b. The coolant liquid carries along the granulate cut by the cutters 34 and transports the granulate particles out of the housing 39. The housing 39 is permanently connected to the nozzle plate 32.

The rotor axis 38 is connected to a driveshaft 43 of the drive motor 42, e.g., by screwing or pinning. The inner chamber of the housing 39 is sealed in relation to the outer chamber by a shaft seal 80, which presses against the rotor axis 38 on the one hand and is mounted in a tubular part 44 on the other hand, which forms a component of the housing 39 via its flange 45. The driveshaft 43 continues in the drive rotor 56 and carries it, wherein the rotor can be a known short circuit rotor of an electrical asynchronous machine. The drive rotor 56 rotates in a stator 46, to which the required electrical power is supplied in a known manner to set the drive rotor 56 into rotation. The stator 46 is mounted in a known and typical manner in the motor housing 47. The motor housing 47 rests via the two supports 48 and 49 on a support frame 50, which is mounted stationary together with the nozzle plate 32, the distance between the nozzle plate 32 and the support frame 50 being permanently fixed.

The linear adjustment element 52 is fastened to one leg 51 of the support frame 50, which is formed by a known linearly acting displacement unit, e.g., by a piston-cylinder unit as symbolically indicated in the linear adjustment element 52. The linear adjustment element 22 acts via its axially displaceable piston 53 on the components situated between it and the rotor axis 38, the displacement of the piston 53 acting on the rotor axis 38 and thus on the cutter head 33. A desired setting results in this manner together with the cutters 34, in particular to compensate for wear, the cutters 34 being brought into contact with the nozzle plate 32 and also at a specific distance to the nozzle plate 32. A rigid connection thus exists between the linear adjustment element 52 and the nozzle plate 32 via the support frame 50, the tubular part 44, and the housing 39.

Oscillation sensors 60 and 61 are installed in the nozzle plate 32 and between the support frame 50 and the linear adjustment element 52, respectively, using which the oscillations on the nozzle plate 32 and the oscillations on the cutters 34 may be detected. The measured signals of the oscillation sensors 60 and 61 are relayed to a frequency analysis unit, which is integrated in the controller of the granulation device 31, via signal lines (not shown). The status of the granulation process and/or the status of the granulation device 31 may be concluded by frequency analysis of the frequency signals measured using the oscillation sensors 60 and 61.

The invention claimed is:

1. A granulator for producing plastic granulate, the granulator comprising:
    a cutting unit, with cutting elements,
        the cutting elements for engaging with, and breaking up, an essentially continuously conveyed plastic mass flow into granulate particles,
        the cutting elements including a fixed cutting strip and a driven cutting rotor which are separated by a cutting gap,
        the plastic mass flow being broken up into granulate particles in the cutting gap;
    a status monitoring system that has at least one oscillation sensor for detecting oscillations on a component of the granulator, the component selected from the group consisting of the cutting strip and the cutting rotor, the at least one oscillation sensor configured for process monitoring.

2. The granulator according to claim 1, further comprising a display unit on which a frequency curve can be displayed, the frequency curve detected using the oscillation sensor.

3. The granulator according to claim 1, further comprising a frequency analysis unit for analyzing a frequency curve, the frequency curve detected using the oscillation sensor.

4. The granulator according to claim 1, wherein the oscillation strength effectively occurring on the granulator may be measured using the oscillation sensor.

5. The granulator according to claim 3, wherein reference frequency curves or reference frequency signals are stored in the frequency analysis unit and may be compared with the frequency curve detected by the oscillation sensor.

6. The granulator according to claim 5, wherein reference oscillation levels are stored in the frequency analysis unit and may be compared with the effectively occurring oscillation strength detected by the oscillation sensor.

7. The granulator according to claim 1, wherein the device comprises an oscillation actuator, for generating oscillation signals for frequency excitation.

8. The granulator according to claim 1, wherein the granulator comprises a fixed nozzle plate, which has nozzles for the exit of malleable plastic strands, and has rotating cutters sweeping over it to break up the malleable plastic.

9. The granulator according to claim 8, wherein the oscillation sensor detects oscillations occurring on the nozzle plate and/or on the cutters.

10. The granulator according to claim 1, wherein the oscillation sensor is configured for continuous process monitoring.

\* \* \* \* \*